Patented Dec. 8, 1936

2,063,634

UNITED STATES PATENT OFFICE 2,063,634

DIANTHRAQUINONYL DICARBOXYLIC ACIDS AND THE PROCESS FOR PREPARING THE SAME

Cecil Shaw, Grangemouth, Scotland, assignor to Imperial Chemical Industries Limited, a corporation of Great Britain No Drawing. Application October 15, 1935, Serial No. 45,161. In Great Britain October 19, 1934

5 Claims. (Cl. 260—57)

This invention relates to the manufacture of a new anthraquinone derivative, namely 2,2'-dianthraquinonyl-1,1'-dicarboxylic acid.

It is known that oxidation of 2,2'-dibenzanthronyl with manganese dioxide in concentrated sulphuric acid leads to a hydroxydibenzanthrone, and that if 2,2'-dibenzanthronyl is oxidized with chromium trioxide in concentrated sulphuric acid there is produced a black vat dyestuff which appears to be a dibenzanthrone derivative.

We have now found that oxidation of 2,2'-dibenzanthronyl with chromium trioxide in an aqueous medium (preferably a dilute sulphuric acid containing about 15-25% of $H_2SO_4$) results in the production of a new compound, namely 2,2'-dianthraquinonyl-1,1'-dicarboxylic acid. The reaction may be represented by the following equation:

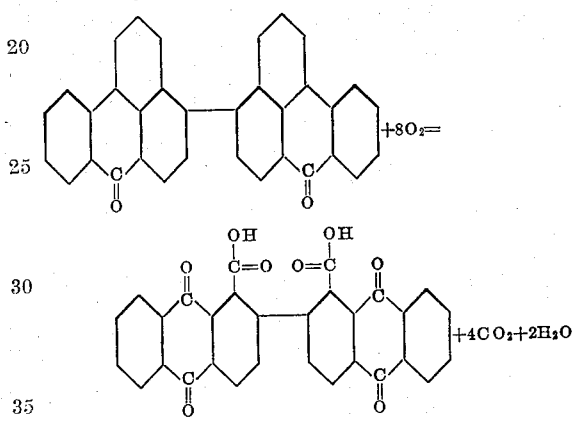

The new compound is a valuable intermediate for the synthesis of dyestuffs.

The invention is illustrated but not limited by the following example, in which the parts are parts by weight.

Example 25 parts of 2,2'-dibenzanthronyl are dissolved in 400 parts of 96% sulphuric acid and the solution is poured into 2000 parts of water which have been previously heated to 70° C. 100 parts of chromium trioxide are added and the mixture is boiled vigorously for 22 hours, under a reflux condenser. After cooling the solid matter is filtered off and washed with water until free from acid. It is then stirred into an excess of dilute aqueous ammonia solution, filtered, the residue is boiled with dilute aqueous ammonia until all soluble matter is removed. The ammoniacal solutions are now acidified, whereupon a cream coloured precipitate is obtained. This is filtered off, washed and dried, (yield 17 parts).

The product is a cream coloured solid which dissolves in concentrated sulphuric acid to give a yellow brown solution. It dissolves in dilute aqueous alkalis and "vats" in the cold to give a red-brown solution. The product has the properties characteristic of a carboxylic acid: the equivalent determined by titration with standard alkali is 250; the calculated value for dianthraquinoyl-dicarboxylic acid is 251.

It appears to be the hitherto unknown 2,2'-dianthraquinonyl-1,1'-dicarboxylic acid.

I claim:—

1. 2,2' - dianthraquinonyl - 1,1' - dicarboxylic acid.

2. Process for the manufacture of a new anthraqinone derivative which comprises oxidizing 2,2'-dibenzanthronyl with chromium trioxide in an aqueous medium.

3. Process as claimed in claim 2 in which the aqueous medium comprises diluted sulphuric acid.

4. Process as claimed in claim 2 in which the aqueous medium comprises 15-25% sulphuric acid.

5. Process for the manufacture of a new anthraquinone derivative which comprises dissolving about 25 parts by weight of 2,2'-dibenzanthronyl in about 400 parts by weight of 96% sulphuric acid, diluting the solution with about 2000 parts by weight of water, adding about 100 parts by weight of chromium trioxide, boiling under reflux for about 22 hours, and isolating the alkali-soluble portion of the product.

CECIL SHAW.